(12) United States Patent
Lee et al.

(10) Patent No.: US 11,335,966 B2
(45) Date of Patent: May 17, 2022

(54) CASE FOR SECONDARY BATTERY, SECONDARY BATTERY, AND BATTERY MODULE

(71) Applicant: LG CHEM, LTD., Seoul (KR)

(72) Inventors: Won Jong Lee, Daejeon (KR); Ki Woong Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 16/960,636

(22) PCT Filed: Aug. 8, 2019

(86) PCT No.: PCT/KR2019/010010
§ 371 (c)(1),
(2) Date: Jul. 8, 2020

(87) PCT Pub. No.: WO2020/122353
PCT Pub. Date: Jun. 18, 2020

(65) Prior Publication Data
US 2020/0335734 A1    Oct. 22, 2020

(30) Foreign Application Priority Data

Dec. 10, 2018 (KR) .......................... 10-2018-0158129

(51) Int. Cl.
*H01M 2/00* (2006.01)
*H01M 50/103* (2021.01)
(Continued)

(52) U.S. Cl.
CPC ....... *H01M 50/103* (2021.01); *H01M 10/058* (2013.01); *H01M 50/147* (2021.01); *H01M 50/20* (2021.01); *H01M 50/10* (2021.01)

(58) Field of Classification Search
CPC .. H01M 50/103; H01M 50/20; H01M 50/147; H01M 50/10; H01M 10/058
See application file for complete search history.

(56) References Cited

U.S. PATENT DOCUMENTS

2007/0015046 A1    1/2007    Kim et al.
2011/0143193 A1    6/2011    Ahn
(Continued)

FOREIGN PATENT DOCUMENTS

CN    203644833 U    6/2014
CN    104282851 A    1/2015
(Continued)

OTHER PUBLICATIONS

KR20130080258A translation (Year: 2013).*
(Continued)

*Primary Examiner* — Jane J Rhee
(74) *Attorney, Agent, or Firm* — Birch, Stewart, Kolasch & Birch, LLP

(57) ABSTRACT

A case for a secondary battery, a secondary battery, and a battery module are provided. Because an uneven part is provided in each of an upper case and a lower case of the secondary battery the upper case and the lower case may be coupled to each other without being misaligned in a process of manufacturing the prismatic type secondary battery.

16 Claims, 8 Drawing Sheets

(51) Int. Cl.
  *H01M 10/058* (2010.01)
  *H01M 50/20* (2021.01)
  *H01M 50/147* (2021.01)
  *H01M 50/10* (2021.01)

(56) References Cited

U.S. PATENT DOCUMENTS

| | | |
|---|---|---|
| 2012/0135300 A1 | 5/2012 | Ota |
| 2015/0017520 A1 | 1/2015 | Kwak et al. |
| 2015/0037664 A1 | 2/2015 | Kang et al. |
| 2017/0110713 A1 | 4/2017 | Otsuka |
| 2019/0189979 A1 | 6/2019 | Choi et al. |
| 2019/0259979 A1 | 8/2019 | Ryu et al. |

FOREIGN PATENT DOCUMENTS

| | | | |
|---|---|---|---|
| CN | 107146860 | A | 9/2017 |
| CN | 108140778 | A | 6/2018 |
| CN | 2018127276 | U | 11/2018 |
| JP | 2003-297317 | A | 10/2003 |
| JP | 4875226 | B2 | 2/2012 |
| JP | 2017-152395 | A | 8/2017 |
| JP | 2018-22586 | A | 2/2018 |
| KR | 10-2007-0007537 | A | 1/2007 |
| KR | 10-2007-0107921 | A | 11/2007 |
| KR | 10-2008-0087193 | A | 10/2008 |
| KR | 10-2011-0049526 | A | 5/2011 |
| KR | 10-2011-0066448 | A | 6/2011 |
| KR | 10-2013-0080258 | A | 7/2013 |
| KR | 10-2013-0124622 | A | 11/2013 |
| KR | 10-2015-0007942 | A | 1/2015 |
| KR | 10-2015-0034708 | A | 4/2015 |
| KR | 10-2017-0062877 | A | 6/2017 |
| KR | 10-2018-0123403 | A | 11/2018 |

OTHER PUBLICATIONS

KR20150007942 translation (Year: 2015).*
International Search Report (PCT/ISA/210) issued in PCT/KR2019/010010 dated Nov. 19, 2019.

* cited by examiner

CASE FOR SECONDARY BATTERY, SECONDARY BATTERY, AND BATTERY MODULE

CROSS-REFERENCE TO RELATED APPLICATION

The present application claims the benefit of the priority of Korean Patent Application No. 10-2018-0158129, filed on Dec. 10, 2018, which is hereby incorporated by reference in its entirety.

TECHNICAL FIELD

The present invention relates to a case for a secondary battery, a secondary battery, and a battery module.

BACKGROUND ART

Secondary batteries that are repetitively chargeable and dischargeable may be divided into pouch type secondary batteries, cylindrical type secondary batteries, and prismatic type secondary batteries according to their manufacturing method or structure.

Among these, the prismatic type secondary batteries have advantages in terms of stability and corrosion resistance against external impacts and the like when compared to other secondary batteries.

As an electronic device is diversified in shape as compared to that according to the related art, a secondary battery mounted on the electronic device is also required to be varied when compared to that according to the related art and is required to be able to store relatively large power when compared to that according to the related art.

Since the case of the prismatic type secondary battery according to the related art generally has a rectangular pillar shape, it is necessary that the prismatic type secondary battery is also manufactured irregularly unlike that according to the related art so as to meet the demand for the shape of the secondary battery.

DISCLOSURE OF THE INVENTION

Technical Problem

Accordingly, to solve the above problems, an object of the present invention is to provide a prismatic type secondary battery that is capable of storing an increasing amount of energy when compared to that according to the inventive concept while having the irregular shape when compared to that according to the related art.

Technical Solution

According to a first aspect of the present invention for achieving the above object, a case for a secondary battery includes: a lower case having an opened upper portion and an empty space therein; and an upper case having an opened lower portion and an empty space therein, wherein, in a coupling region in which an upper region of the lower case and a lower region of the upper case contact each other, the upper region of the lower case includes a lower case uneven part, and the lower region of the upper case includes an upper case uneven part having a shape corresponding to that of the lower case uneven part and facing the lower case uneven part.

The upper region of the lower case may have a predetermined thickness below the lower case uneven part, and the lower case uneven part may have a variable height along the predetermined thickness of the upper region of the lower case.

An inner region of the lower case uneven part may protrude upward, and an outer region of the lower case uneven part may be recessed downward.

An inner region of the lower case uneven part may be recessed downward, and an outer region of the lower case uneven part may protrude upward.

An inner region and an outer region of the lower case uneven part may be recessed downward, and an intermediate region of the lower case uneven part between the inner region and the outer region of the lower case uneven part may protrude upward.

An inner region and an outer region of the lower case uneven part may protrude upward, and an intermediate region of the lower case uneven part between the inner region and the outer region of the lower case uneven part may be recessed downward.

The lower case uneven part may include: a first lower case uneven part provided in a first portion of the upper region of the lower case; and a second lower case uneven part provided in a second portion of the upper portion of the lower case, the second lower case uneven part being across the empty space from the first lower case uneven part.

An inner region of each of the first lower case uneven part and the second lower case uneven part may protrude upward, and an outer region of each of the first lower case uneven part and the second lower case uneven part may be recessed downward.

An inner region of the first lower case uneven part may protrude upward, an outer region of the first lower case uneven part may be recessed downward, an inner region of the second lower case uneven part may be recessed downward, and an outer region of the second lower case uneven part may protrude upward.

Each of an inner region and an outer region of each of the first lower case uneven part and the second lower case uneven part may be recessed downward, and an intermediate region of each of the first lower case uneven part and the second lower case uneven part between the inner region and the outer region of each of the first lower case uneven part and the second lower case uneven part may protrude upward.

Each of an inner region and an outer region of the first lower case uneven part may be recessed downward, an intermediate region of the first lower case uneven part between the inner region and the outer region of the first lower case uneven part may protrude upward, each of an inner region and an outer region of the second lower case uneven part may protrude upward, and an intermediate region of the second lower case uneven part between the inner region and the outer region of the second lower case uneven part the lower case may be recessed downward.

The upper region of the lower case may have a predetermined thickness below the lower case uneven part, and the lower case uneven part may have a shape that is inclined downward from an outer region to an inner region of the lower case uneven part.

The lower case uneven part may be provided in plurality along a width of the lower case.

When viewed from above the upper case, each of the upper case and the lower case may have an L shape.

The lower case uneven part and the upper case uneven part may be bonded to each other in the coupling region through welding.

According to a second aspect of the present invention for achieving the above object, a secondary battery includes: the case described above; and an electrode assembly provided within the case.

According to a third aspect of the present invention for achieving the above object, a battery module includes a plurality of secondary batteries.

Advantageous Effects

According to the present invention, the prismatic type secondary battery that is capable of storing an increasing amount of energy when compared to that according to the related art while having the irregular shape when compared to that according to the related art.

MODE FOR CARRYING OUT THE INVENTION

Hereinafter, a structure of a case for a secondary battery according to the present invention will be described with reference to the accompanying drawings.

Case for Secondary Battery

Figure 1:
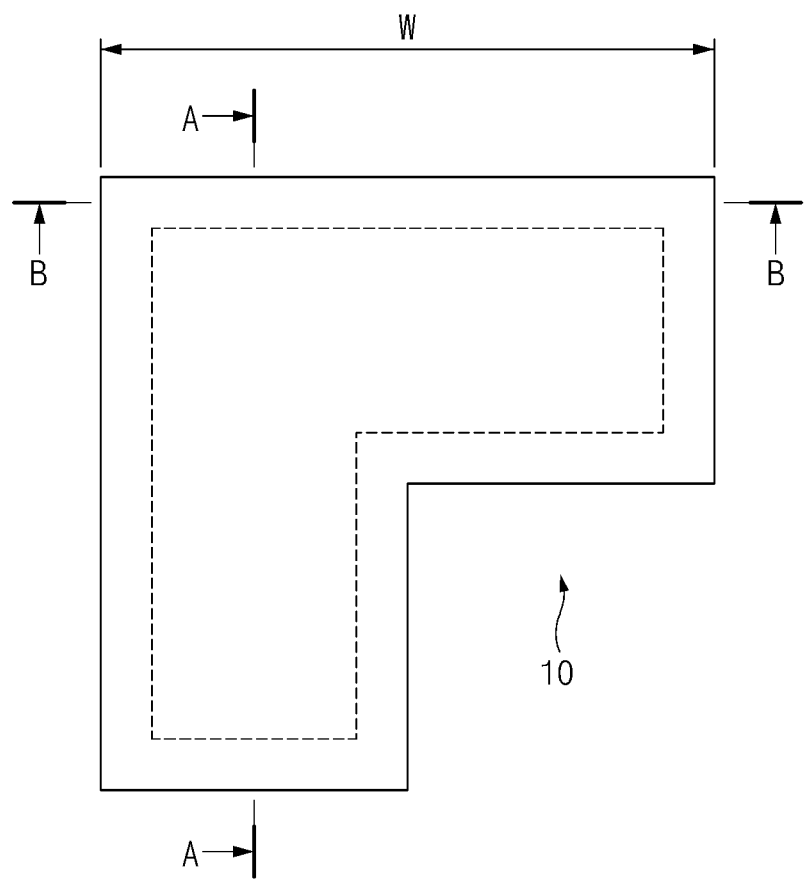
FIG. 1 is a plan view illustrating a structure of a case for a secondary battery according to the present invention.

FIG. 1 is a plan view illustrating a structure of a case for a secondary battery according to the present invention.

A case for a secondary battery according to the present invention may be a case used for a prismatic type secondary battery. Also, the case for the secondary battery according to the present invention may include a stainless steel material.

Referring to FIG. 1, the case 10 for the secondary battery according to the present invention may have an irregular shape. For example, as illustrated in FIG. 1, the case 10 for the secondary battery may have an L shape. However, the present invention is not limited to the L-shaped case for the secondary battery. Also, the case for the secondary battery according to the present invention may be made of a stainless steel material.

Figure 2:
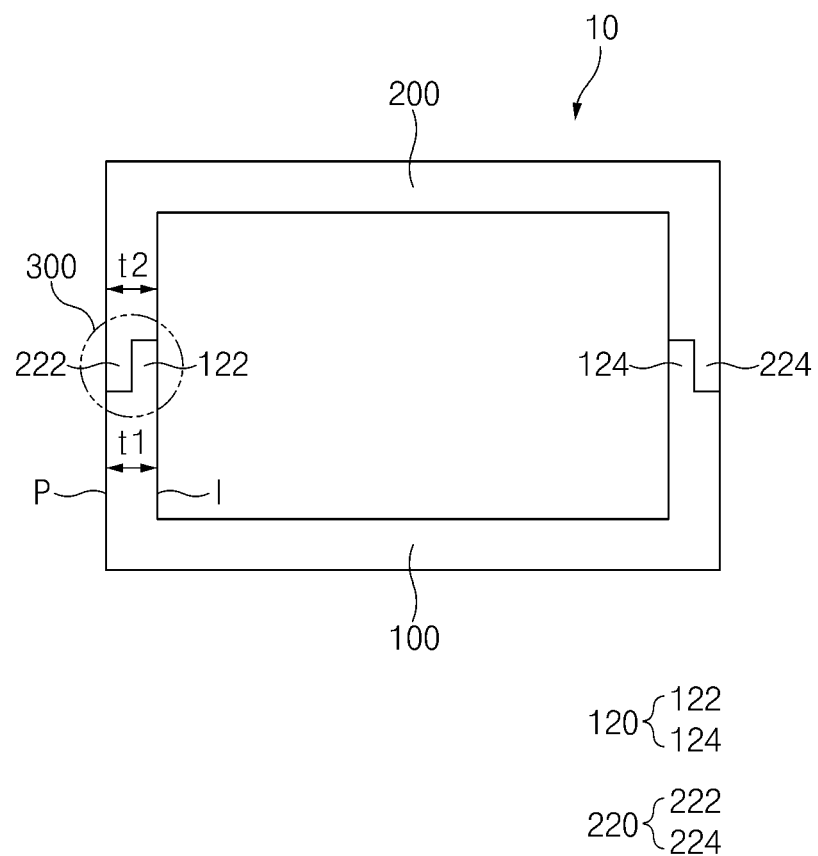
FIG. 2 is a side cross-sectional view illustrating a structure of a case for a secondary battery, which is cut in an A-A direction of FIG. 1, according to a first embodiment.

FIG. 2 is a side cross-sectional view illustrating a structure of a case for a secondary battery, which is taken along line A-A of FIG. 1, according to a first embodiment.

As illustrated in FIG. 2, the case 10 for the secondary battery may include a lower case 100 defining a lower region of the case for the secondary battery and an upper case 200 defining an upper region of the case for the secondary battery. As illustrated in FIG. 2, the lower case 100 may have an opened upper portion and an empty space formed therein, and the upper case 200 may have an opened lower portion and an empty space formed therein.

Sequentially, referring to FIG. 2, each of the lower case 100 and the upper case 200 may have a predetermined thickness. That is, as illustrated in FIG. 2, the upper region of the lower case 100 may have a thickness of $t_1$, and the lower region of the upper case 200 may have a thickness of $t_2$. The thicknesses $t_1$ and $t_2$ may be the same, but the thicknesses $t_1$ and $t_2$ may be different from each other.

According to the present invention, a coupling part 300 that is a region in which the upper region of the lower case 100 and the lower region of the upper case 200 contact each other may be provided in the case 10 for the secondary battery 10. As illustrated in FIG. 2, the coupling part 300 may be provided in an upper end of the upper region of the lower case 100. Alternatively, the coupling part 300 may be provided in a lower end of the lower region of the upper case 200.

As illustrated in FIG. 2, according to the present invention, a lower case uneven part 120 having a variable height according to a position may be provided at an end of the upper region of the lower case 100 on at least partial region of the coupling part 300. Also, an upper case uneven part 220 having a variable height according to a position may be provided at an end of the lower region of the upper case 200, which faces the lower case uneven part 120. As illustrated in FIG. 2, the upper case uneven part 220 may have a shape corresponding to that of the lower case uneven part 120.

The lower case uneven part 120 and the upper case uneven part 220 may be bonded to each other at the coupling part 300 by welding. For example, the welding may be laser welding.

When the upper case having the empty space therein and the lower case having the empty space therein are coupled to each other to manufacture the prismatic type secondary battery, it is necessary to be coupled at a portion at which the upper case and the lower case contact each other. However, when the point, at which the upper case and the lower case contact each other, is flat, the upper case and the lower case may be likely to be misaligned with each other at the contact point so that the coupling between the upper case and the lower case is not properly performed. As a result, a sealing property of the case for the secondary battery may be deteriorated.

However, according to the present invention, the uneven may be provided at the region in which the upper case and the lower case contact each other to solve the problem of the misalignment during the coupling process between the upper case and the lower case. Thus, the coupling part (i.e., joint) that is the region in which the upper case and the lower case are coupled to each other may be uniform to improve the sealing property of the case for the secondary battery. Thus, leakage of an electrolyte within the secondary battery to the outside may be prevented.

Also, as described above, according to the present invention, since the coupling part, which is the region in which the upper case and the lower case are coupled to each other, is uniformly formed, the welding process for bonding the upper case to the lower case may be more easily performed.

As illustrated in FIG. 2, the lower case uneven part 120 may vary in height in a direction of the thickness $t_1$ of the upper region of the lower case 100. Similarly, the upper case uneven part 220 may vary in height in a direction of the thickness $t_2$ of the lower region of the upper case 200.

According to the present invention, each of the lower case uneven part 120 and the upper case uneven part 220 may be provided in plurality. That is, as illustrated in FIG. 2, the lower case uneven part 120 may include a first lower case uneven part 122 disposed in one region of the upper region of the lower case 100 and a second lower case uneven part 124 disposed in the other region of the upper region of the lower case 100. As illustrated in FIG. 2, the second lower case uneven part 124 may be disposed in a region opposite to the region in which the first lower case uneven part 122 is disposed.

Similarly, the upper case uneven part 220 may include a first upper case uneven part 222 disposed in one region of the lower region of the upper case 200 and a second upper case uneven part 224 disposed in the other region of the lower region of the upper case 200. As shown in FIG. 2, the second upper case uneven part 224 may be disposed in a region opposite to the region in which the first upper case uneven part 222 is disposed. Hereinafter, shapes of the lower case uneven part 120 and the upper case uneven part 220 will be described in more detail.

As shown in FIG. 2, according to the first embodiment of the present invention, an inner region (i.e., the inside I in the thickness direction of the case for the secondary battery) of the first lower case uneven part 122 in the direction of the thickness $t_1$ of the upper region of the lower case 100 may protrude upward, and an outer region (i.e., a region adjacent to the outside P in the thickness direction of the case for the secondary battery) of the first lower case uneven part 122 in the direction of the thickness $t_1$ of the upper region of the lower case 100 may be recessed downward. Thus, as illustrated in FIG. 2, a stepped portion having a stair shape may be provided on the first lower case uneven part 122.

Sequentially, as illustrated in FIG. 2, the second lower case uneven part 124 according to the present invention may also have the same structure as the first lower case uneven part 122. That is, as illustrated in FIG. 2, an inner region of the second lower case uneven part 124 in the direction of the thickness $t_1$ of the upper region of the lower case 100 may protrude upward, and an outer region of the second lower case uneven part 124 in the direction of the thickness $t_1$ of the upper region of the lower case 100 may be recessed downward. Thus, a stepped portion having a stair shape may be provided on the second lower case uneven part 124.

According to the first embodiment of the present invention, the first upper case uneven part 222 and the second upper case uneven part 224 may have shapes corresponding to those of the first lower case uneven part 122 and the second lower case uneven part 124, respectively.

That is, as illustrated in FIG. 2, an inner region of the first upper case uneven part 222 in the direction of the thickness $t_2$ of the lower region of the upper case 200 may be recessed upward, and an outer region of the first upper case uneven part 222 in the direction of the thickness $t_2$ of the lower region of the upper case 200 may protrude downward. Similarly, an inner region of the second upper case uneven part 224 in the direction of the thickness $t_2$ of the lower region of the upper case 200 may be recessed upward, and an outer region of the second upper case uneven part 224 in the direction of the thickness $t_2$ of the lower region of the upper case 200 may protrude downward. Therefore, a stepped portion having a stair shape may be provided on each of the first upper case uneven part 222 and the second upper case uneven part 224.

As illustrated in FIG. 2, according to the first embodiment of the present invention, the first lower case uneven part 122 and the second lower case uneven part 124, which are provided in the lower case 100 of the case 10 for the secondary battery may be disposed symmetrically with respect to a center of the case 10 for the secondary battery, and also, the first upper case uneven part 222 and the second upper case uneven part 224, which are provided in the upper case 200, may be disposed symmetrically with each other. In this case, the manufacturability of the case 10 for the secondary battery may be improved. That is, unlike the configuration of FIG. 2, even if the first lower case uneven part 122 and the second upper case uneven part 224 face each other, and the second lower case uneven part 124 and the first upper case uneven part 222 face each other, the uneven parts may be coupled to each other to manufacture the case 10 for the secondary battery, thereby reducing a time taken to couple the lower case 100 to the upper case 200.

Figure 3:
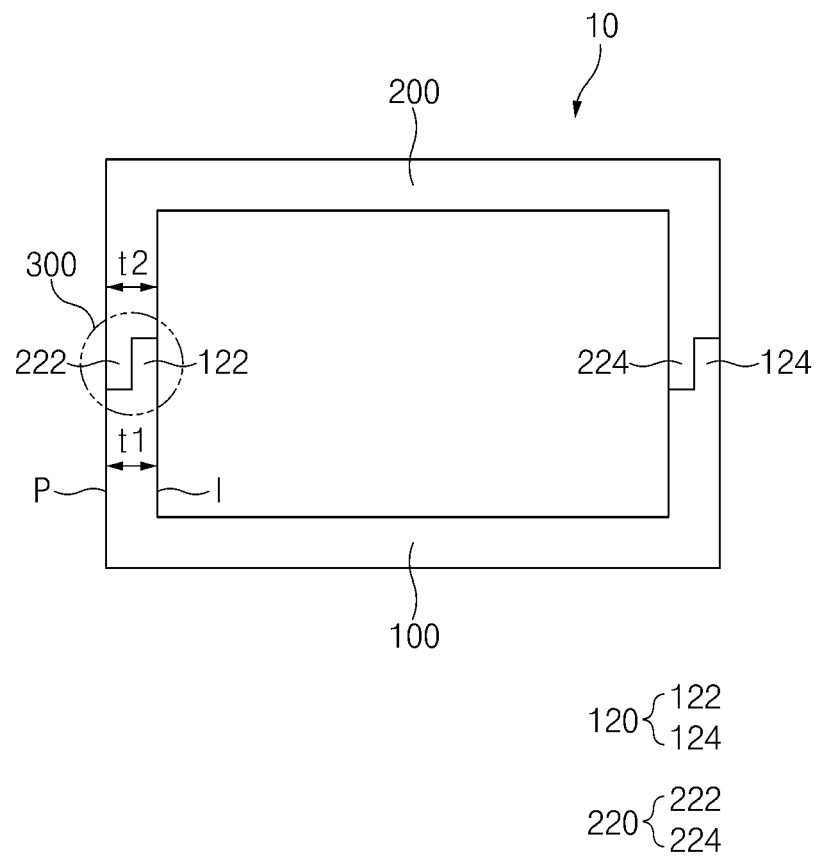
FIG. 3 is a side cross-sectional view illustrating a structure of a case for a secondary battery, which is cut in the A-A direction of FIG. 1, according to a second embodiment.

FIG. 3 is a side cross-sectional view illustrating a structure of a case for a secondary battery, which is taken along line A-A of FIG. 1, according to a second embodiment. In a case for a secondary battery according to a second embodiment of the present invention, since each of a first lower case uneven part 122 and a first upper case uneven part 222 has the same structure as that according to the first embodiment, and thus, only structures of a second lower case uneven part 124 and a second upper case uneven part 224 will be described.

As illustrated in FIG. 3, a stepped portion having a stair shape may also be provided on each of the second lower case uneven part 124 and the second upper case uneven part 224.

However, an inner region of the second lower case uneven part 124 in a direction of a thickness $t_1$ of an upper region of a lower case 100 may be recessed downward, and an outer region of the second lower case uneven part 124 in the direction of the thickness $t_1$ of the upper region of the lower case 100 may protrude upward.

Also, an inner region of the second upper case uneven part 224 in a direction of a thickness $t_2$ of the lower region of the upper case 200 may protrude downward, and an outer region of the second upper case uneven part 224 in the direction of the thickness $t_2$ of the lower region of the upper case 200 may be recessed upward.

As illustrated in FIG. 3, according to the second embodiment of the present invention, the first lower case uneven part 122 and the second lower case uneven part 124, which are provided in the lower case 100 of the case 10 for the secondary battery may have shapes similar or equal to each other, and the first upper case uneven part 222 and the second upper case uneven part 224, which are provided in the upper case 200, may also have shapes similar to equal to each other. In this case, even if dimensions of the uneven parts 122, 124, 222, and 224 are slightly different from each other due to a tolerance occurring during the formation of the uneven parts 122, 124, 222, and 224 of the lower case 100 and the upper case 200, the first lower case uneven part 122 and the first upper case uneven part 222 may be coupled to each other, and also, the second lower case uneven part 124 and the second upper case uneven part 224 may be coupled to each other. Therefore, since a problem, in which a portion of the lower case 100 and the upper case 200, which are prepared in advance for manufacturing the case 10 for the secondary battery, is not used and discarded due to different dimensions, is minimized, the manufacturing cost of the case for the secondary battery may be maximized.

Figure 4:
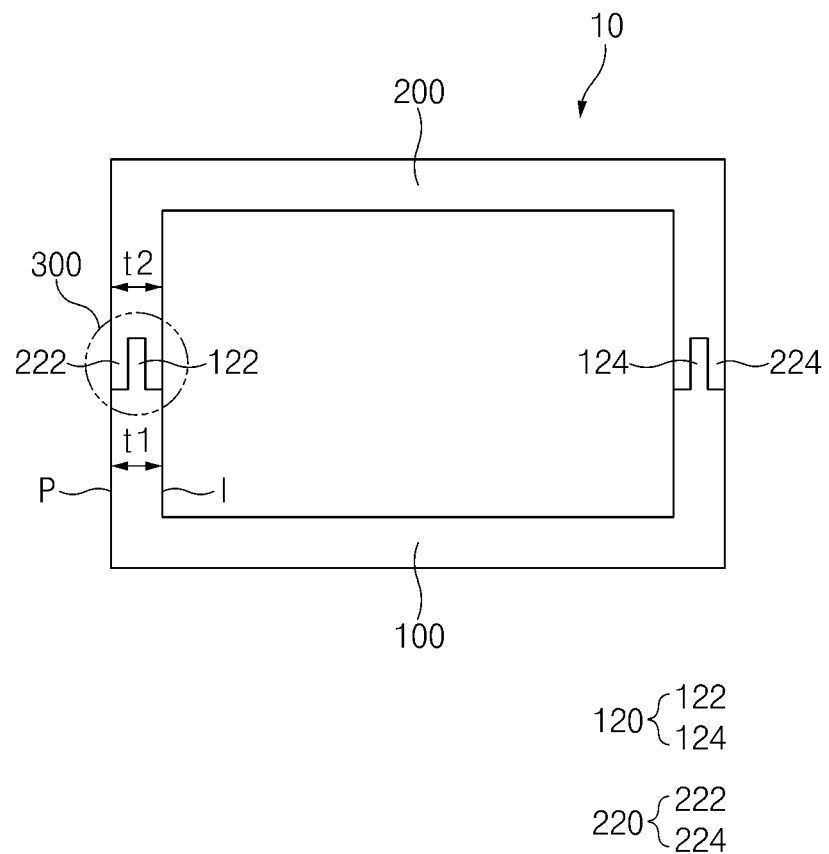
FIG. 4 is a side cross-sectional view illustrating a structure of a case for a secondary battery, which is cut in the A-A direction of FIG. 1, according to a third embodiment.

FIG. 4 is a side cross-sectional view illustrating a structure of a case for a secondary battery, which is taken along line A-A of FIG. 1, according to a third embodiment.

As illustrated in FIG. 4, in a case 10 for a secondary battery according to a third embodiment of the present invention, an inner region and an outer region of a first lower case uneven part 122 in a direction of a thickness $t_1$ of an upper region of a lower case 100 may be recessed downward, and an intermediate region of the first lower case uneven part 122 in the direction of the thickness $t_1$ of the upper region of the lower case 100 may protrude upward. That is, according to the third embodiment of the present invention, the intermediate region of the first lower case uneven part 122 may be formed to be convex upward.

On the other hand, in the case 10 for the secondary battery according to the third embodiment of the present invention, the inner region and the outer region of a first upper case uneven part 222 in a direction of a thickness $t_2$ of a lower region of an upper case 100 may protrude downward, and an intermediate region of the first upper case uneven part 122 in the direction of the thickness $t_2$ of the lower region of the upper case 100 may be recessed upward. That is, according to the third embodiment of the present invention, the intermediate region of the first upper case uneven part 222 may be formed to be concave upward.

In the case 10 for the secondary battery according to the third embodiment of the present invention, the second lower case uneven part 124 may have the same shape as the first lower case uneven part 122. That is, as illustrated in FIG. 4, an inner region and an outer region of a second lower case uneven part 124 in the direction of the thickness $t_1$ of the upper region of the lower case 100 may be recessed downward, and an intermediate region of the second lower case uneven part 124 in the direction of the thickness $t_1$ of the upper region of the lower case 100 may protrude upward.

Also, in the case 10 for the secondary battery according to the third embodiment of the present invention, the second upper case uneven part 224 may have the same shape as the first upper case uneven part 222. That is, as illustrated in FIG. 4, an inner region and an outer region of the second upper case uneven part 224 in the direction of the thickness $t_2$ of the lower region of the upper case 200 may protrude downward, and an intermediate region of the second upper case uneven part 224 in the direction of the thickness $t_2$ of the lower region of the upper case 200 may be recessed upward.

As illustrated in FIG. 4, according to the third embodiment of the present invention, the first lower case uneven part 122 and the second lower case uneven part 124, which are provided in the lower case 100 of the case 10 for the secondary battery may be disposed symmetrically with respect to a center of the case 10 for the secondary battery, and also, the first upper case uneven part 222 and the second upper case uneven part 224, which are provided in the upper case 200, may be disposed symmetrically with each other. In this case, for the same reason as in the first embodiment of the present invention, the manufacturability of the case 10 for the secondary battery may be improved.

In addition, according to the third embodiment of the present invention, when compared to the first embodiment of the present invention, an area, on which the first lower case uneven part 122 and the first upper case uneven part 222 contact each other, and an area, on which the second lower case uneven part 124 and the second upper case uneven parts 224 contact each other, may increase. Therefore, according to the third embodiment of the present invention, the coupling force between the lower case 100 and the upper case 200 may be improved.

Figure 5:
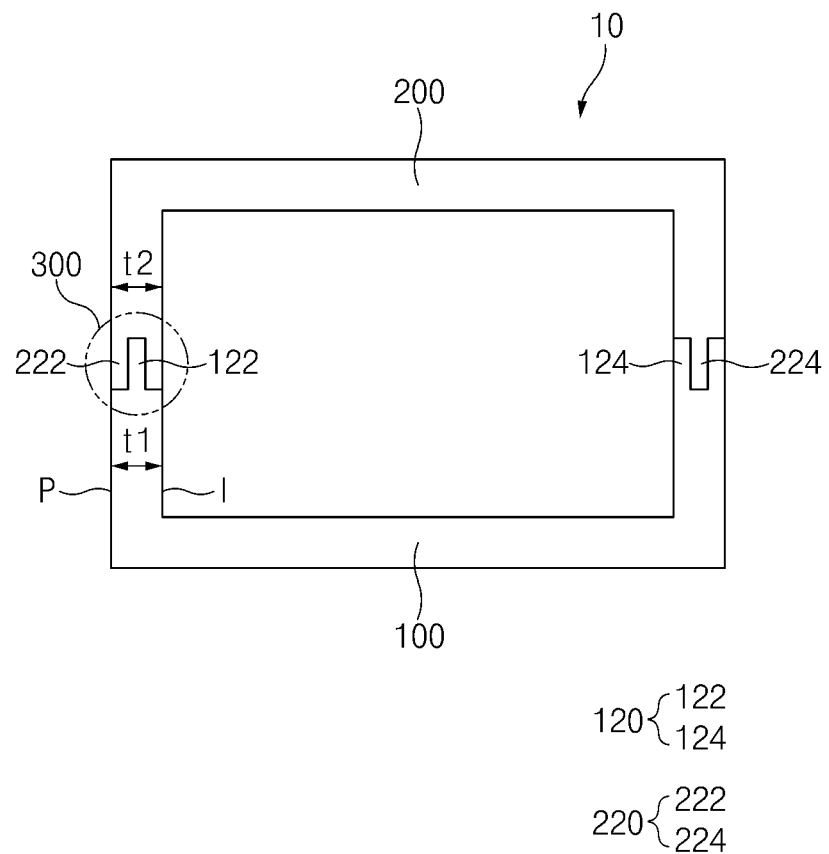
FIG. 5 is a side cross-sectional view illustrating a structure of a case for a secondary battery, which is cut in the A-A direction of FIG. 1, according to a fourth embodiment.

FIG. 5 is a side cross-sectional view illustrating a structure of a case for a secondary battery, which is taken along line A-A of FIG. 1, according to a fourth embodiment.

Since a first lower case uneven part 122 and a first upper case uneven part 222 according to a fourth embodiment of the present invention have the same structure as the first lower case uneven part and the first upper case uneven part according to the third embodiment of the present invention, only structures of a second lower case uneven part 124 and a second upper case uneven part 224 will be described.

As illustrated in FIG. 5, in a case 10 for a secondary battery according to the fourth embodiment of the present invention, an inner region and an outer region of a second lower case uneven part 124 in a direction of a thickness $t_1$ of an upper region of a lower case 100 may protrude upward, and an intermediate region of the second lower case uneven part 124 in the direction of the thickness $t_1$ of the upper region of the lower case 100 may be recessed downward.

Also, in the case 10 for the secondary battery according to the fourth embodiment of the present invention, the inner region and the outer region of a second upper case uneven part 224 in a direction of a thickness $t_2$ of a lower region of an upper case 200 may be recessed upward, and an intermediate region of the second upper case uneven part 224 in the direction of the thickness $t_2$ of the lower region of the upper case 200 may protrude downward.

As illustrated in FIG. 5, according to the fourth embodiment of the present invention, the first lower case uneven part 122 and the second lower case uneven part 124, which are provided in the lower case 100 of the case 10 for the secondary battery may have shapes similar or equal to each other, and the first upper case uneven part 222 and the second upper case uneven part 224, which are provided in the upper case 200, may also have shapes similar to equal to each other. In this case, for the same reason as in the second embodiment of the present invention, the manufacturing cost of the case 10 for the secondary battery may be maximally reduced.

In addition, according to the fourth embodiment of the present invention, when compared to the second embodiment of the present invention, an area, on which the first lower case uneven part 122 and the first upper case uneven part 222 contact each other, and an area, on which the second lower case uneven part 124 and the second upper case uneven parts 224 contact each other, may increase. Therefore, according to the fourth embodiment of the present invention, the coupling force between the lower case 100 and the upper case 200 may be improved.

Figure 6:
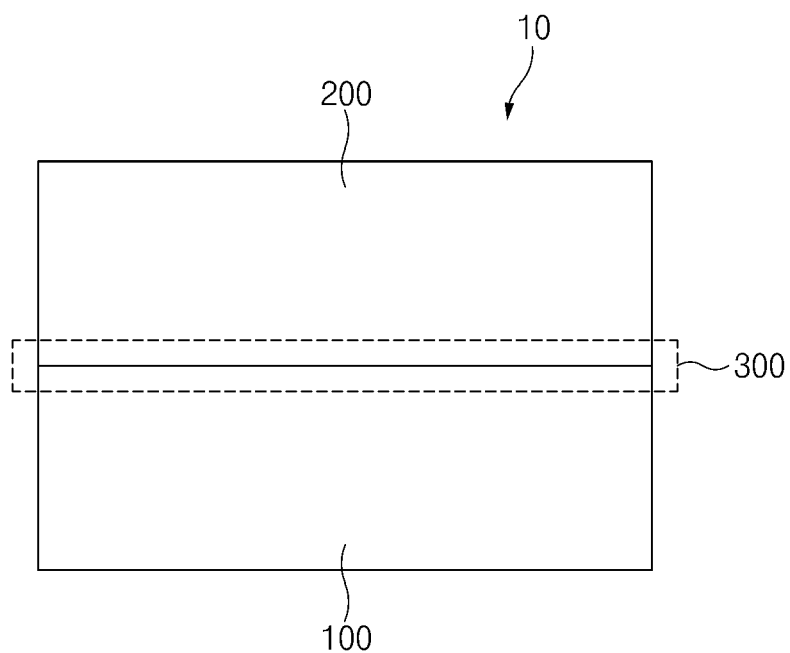
FIG. 6 is a side cross-sectional view illustrating an example of the structure of the case for the secondary battery, which is cut in a B-B direction of FIG. 1.
Figure 7:
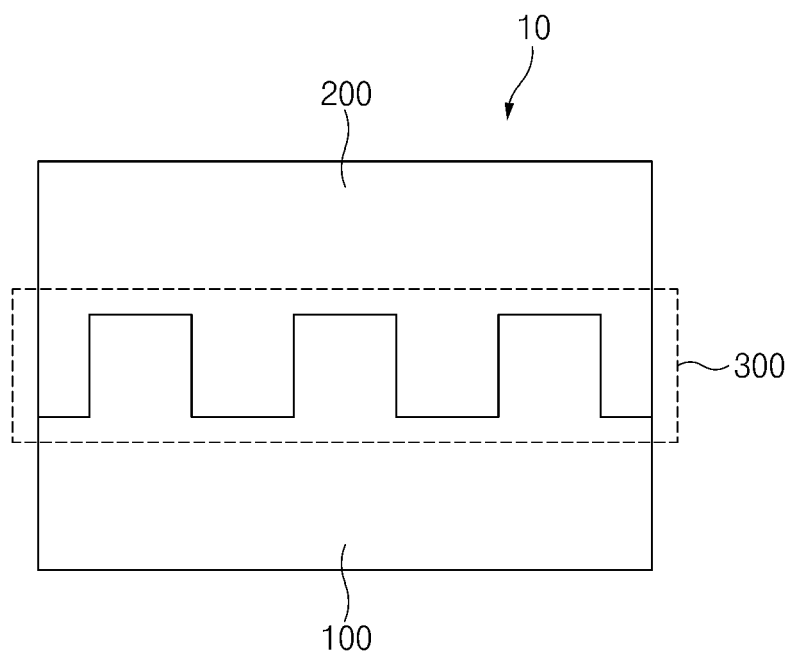
FIG. 7 is a side cross-sectional view illustrating another example of the structure of the case for the secondary battery, which is cut in the B-B direction of FIG. 1.

FIG. 6 is a side cross-sectional view illustrating an example of the structure of the case for the secondary battery, which is cut in a B-B direction of FIG. 1, and FIG. 7 is a side cross-sectional view illustrating another example of the structure of the case for the secondary battery, which is cut in the B-B direction of FIG. 1.

As illustrated in FIG. 6, an area on which the first lower case uneven part and the first upper case uneven part contact each other in a cross-section when the case for the secondary battery is cut in the B-B direction of FIG. 1 may have a linear shape. That is, in the case 10 for the secondary battery according to the present invention, it may be understood that only one first lower case uneven part and only one first upper case uneven part are formed over the direction of the width W of the case for the secondary battery.

However, on the other hand, as illustrated in FIG. 7, an area on which the first lower case uneven part and the first upper case uneven part contact each other in a cross-section when the case for the secondary battery is cut in the B-B direction of FIG. 1 may have an uneven shape. That is, in the case 10 for the secondary battery according to the present invention, it may be understood that a plurality of first lower case uneven parts and a plurality of first upper case uneven parts are formed over the direction of the width W of the case for the secondary battery.

Figure 8:
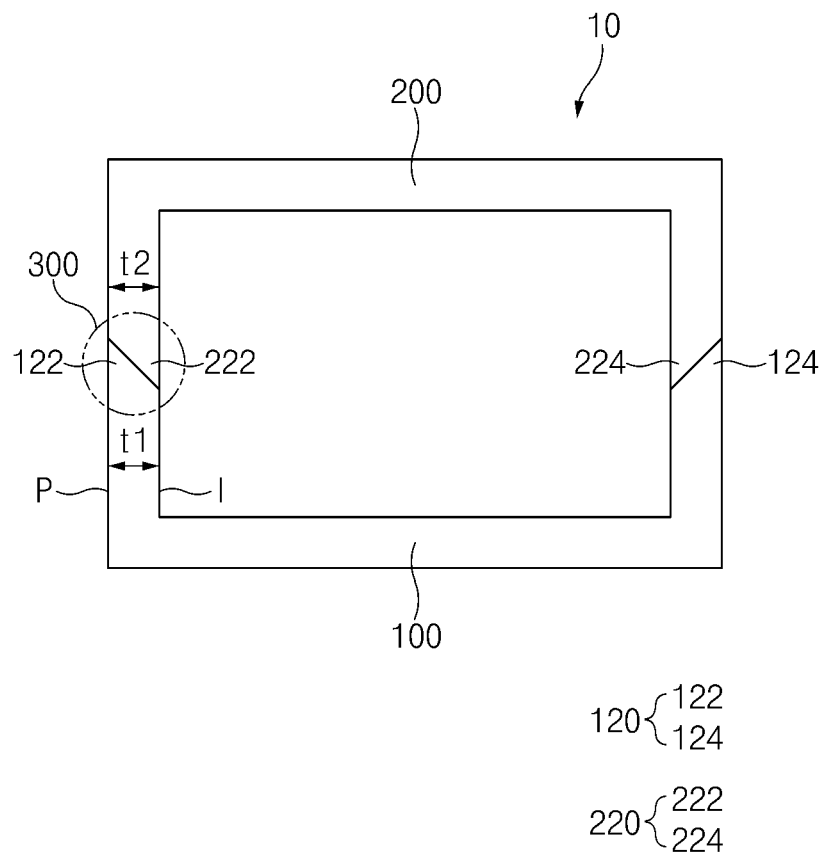
FIG. 8 is a side cross-sectional view illustrating a structure of a case for a secondary battery, which is cut in the A-A direction of FIG. 1, according to a fifth embodiment.

FIG. 8 is a side cross-sectional view illustrating a structure of a case for a secondary battery, which is cut in the A-A direction of FIG. 1, according to a fifth embodiment.

Unlike the first to fourth embodiments of the present invention, a first lower case uneven part 122 may have a shape that is inclined downward from an outer end to an inner end in a direction of a thickness $t_1$ of an upper region of a lower case 100. FIG. 8 illustrates a case in which a second lower case uneven part 124 also has the same structure as the first lower case uneven part 122.

Also, illustrated in FIG. 8, each of a first upper case uneven part 222 and a second upper case uneven part 224 may also have a shape that is inclined downward from an outer end to an inner end in a direction of a thickness $t_2$ of a lower region of an upper case 200.

As illustrated in FIG. 8, according to the fifth embodiment of the present invention, since the upper region of the lower case 100 and the lower region of the upper case 200 are only obliquely cut in order to form the uneven parts of the lower case 100 and the upper case 200, a process of forming the uneven parts may be simplified when compared to that according to the first to fourth embodiments.

However, unlike the configuration of FIG. 8, according to a sixth embodiment of the present invention, a second lower case uneven part 124 may have a shape that is inclined downward from an inner end to an outer end in a direction of a thickness $t_1$ of an upper region of a lower case 100, and a second upper case uneven part 224 may also have a shape that is inclined downward from an inner end to an outer end in a direction of a thickness $t_2$ of a lower region of an upper case 200. In this case, even if dimensions of the uneven parts 122, 124, 222, and 224 are slightly different from each other due to a tolerance occurring during the formation of the uneven parts 122, 124, 222, and 224 of the lower case 100 and the upper case 200, the first lower case uneven part 122 and the first upper case uneven part 222 may be coupled to each other, and also, the second lower case uneven part 124 and the second upper case uneven part 224 may be coupled to each other. Therefore, similar to the case of the second and fourth embodiments of the present invention, since a problem, in which a portion of the lower case 100 and the upper case 200, which are prepared in advance for manufacturing the case 10 for the secondary battery, is not used and discarded due to different dimensions, is minimized, the manufacturing cost of the case for the secondary battery may be maximized.

According to the present invention, a secondary battery is disclosed. The secondary battery according to the present invention may include an electrode assembly having a structure, in which electrodes and separators are alternately disposed, and a case for the secondary battery accommodating the electrode assembly. Description of the structure of the case for the secondary battery is replaced with the above description.

Also, according to the present invention, a battery module is disclosed. The battery module according to the present invention may include a plurality of secondary batteries including the aforementioned case for the secondary battery.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A case for a secondary battery, comprising:
   a lower case having an opened upper portion and an empty space therein; and
   an upper case having an opened lower portion and an empty space therein,
   wherein, in a coupling region in which an upper region of the lower case and a lower region of the upper case contact each other, such that the upper case is located above the lower case, the upper region of the lower case includes a lower case uneven part, and the lower region of the upper case includes an upper case uneven part having a shape corresponding to that of the lower case uneven part and facing the lower case uneven part, and
   wherein, when viewed from above the upper case, each of the upper case and the lower case has an L shape.

2. The case of claim 1, wherein the upper region of the lower case has a predetermined thickness below the lower case uneven part, and
   the lower case uneven part has a variable height along the predetermined thickness of the upper region of the lower case.

3. The case of claim 2, wherein an inner region of the lower case uneven part protrudes upward, and
   an outer region of the lower case uneven part is recessed downward.

4. The case of claim 2, wherein an inner region of the lower case uneven part is recessed downward, and
   an outer region of the lower case uneven part protrudes upward.

5. The case of claim 2, wherein an inner region and an outer region of the lower case uneven part are recessed downward, and
   an intermediate region of the lower case uneven part between the inner region and the outer region of the lower case uneven part protrudes upward.

6. The case of claim 2, wherein an inner region and an outer region of the lower case uneven part protrude upward, and
   an intermediate region of the lower case uneven part between the inner region and the outer region of the lower case uneven part is recessed downward.

7. The case of claim 2, wherein the lower case uneven part comprises:
   a first lower case uneven part provided in a first portion of the upper region of the lower case; and
   a second lower case uneven part provided in a second portion of the upper region of the lower case, the second lower case uneven part being across the empty space from the first lower case uneven part.

8. The case of claim 7, wherein an inner region of each of the first lower case uneven part and the second lower case uneven part protrudes upward, and
   an outer region of each of the first lower case uneven part and the second lower case uneven part is recessed downward.

9. The case of claim 7, wherein an inner region of the first lower case uneven part protrudes upward, an outer region of the first lower case uneven part is recessed downward,
an inner region of the second lower case uneven part is recessed downward, and
an outer region of the second lower case uneven part protrudes upward.

10. The case of claim 7, wherein each of an inner region and an outer region of each of the first lower case uneven part and the second lower case uneven part is recessed downward, and
an intermediate region of each of the first lower case uneven part and the second lower case uneven part between the inner region and the outer region of each of the first lower case uneven part and the second lower case uneven part protrudes upward.

11. A case for a secondary battery, comprising:
a lower case having an opened upper portion and an empty space therein; and
an upper case having an opened lower portion and an empty space therein,
wherein, in a coupling region in which an upper region of the lower case and a lower region of the upper case contact each other, the upper region of the lower case includes a lower case uneven part, and the lower region of the upper case includes an upper case uneven part having a shape corresponding to that of the lower case uneven part and facing the lower case uneven part,
wherein the upper region of the lower case has a predetermined thickness below the lower case uneven part,
wherein the lower case uneven part has a variable height along the predetermined thickness of the upper region of the lower case,
wherein the lower case uneven part comprises:
a first lower case uneven part provided in a first portion of the upper region of the lower case; and
a second lower case uneven part provided in a second portion of the upper region of the lower case, the second lower case uneven part being across the empty space from the first lower case uneven part, and
wherein each of an inner region and an outer region of the first lower case uneven part is recessed downward,
wherein an intermediate region of the first lower case uneven part between the inner region and the outer region of the first lower case uneven part protrudes upward,
wherein each of an inner region and an outer region of the second lower case uneven part protrudes upward, and
wherein an intermediate region of the second lower case uneven part between the inner region and the outer region of the second lower case uneven part is recessed downward.

12. A case for a secondary battery, comprising:
a lower case having an opened upper portion and an empty space therein; and
an upper case having an opened lower portion and an empty space therein,
wherein, in a coupling region in which an upper region of the lower case and a lower region of the upper case contact each other, the upper region of the lower case includes a lower case uneven part, and the lower region of the upper case includes an upper case uneven part having a shape corresponding to that of the lower case uneven part and facing the lower case uneven part,
wherein the lower region of the upper case has a predetermined thickness above the upper case uneven part,
wherein the upper region of the lower case has a predetermined thickness below the lower case uneven part,
wherein the lower case uneven part has a shape that is inclined downward from an outer region of the lower case uneven part to an inner region of the lower case uneven part, and
wherein the upper case and the lower case have equal heights.

13. A case for a secondary battery, comprising:
a lower case having an opened upper portion and an empty space therein; and
an upper case having an opened lower portion and an empty space therein,
wherein, in a coupling region in which an upper region of the lower case and a lower region of the upper case contact each other, the upper region of the lower case includes a lower case uneven part, and the lower region of the upper case includes an upper case uneven part having a shape corresponding to that of the lower case uneven part and facing the lower case uneven part,
wherein the upper region of the lower case has a predetermined thickness below the lower case uneven part,
wherein the lower case uneven part has a variable height along the predetermined thickness of the upper region of the lower case, and
wherein the lower case uneven part is provided in a repeating pattern along a width of the lower case.

14. The case of claim 1, wherein the lower case uneven part and the upper case uneven part are bonded to each other in the coupling region through welding.

15. A secondary battery comprising:
the case of claim 1; and
an electrode assembly provided within the case.

16. A battery module comprising a plurality of secondary batteries of claim 15.

* * * * *